United States Patent [19]

Chen

[11] Patent Number: 5,547,046
[45] Date of Patent: Aug. 20, 1996

[54] BRAKE MECHANISM FOR BICYCLE

[76] Inventor: Zen-Ming Chen, P.O. Box 53-8, Taichung, Taiwan

[21] Appl. No.: 519,152

[22] Filed: Aug. 21, 1995

[51] Int. Cl.[6] .................................................. B62L 1/12
[52] U.S. Cl. ................... 188/24.21; 188/24.19; 188/24.12
[58] Field of Search ............................ 188/24.21, 24.11, 188/24.12, 24.13, 24.22, 250 G, 234, 24.19; 403/408

[56] References Cited

U.S. PATENT DOCUMENTS

| | | | |
|---|---|---|---|
| 2,160,181 | 5/1939 | Taylor | 188/24.21 |
| 3,305,048 | 2/1967 | Brilando | 188/24.12 |
| 3,861,716 | 1/1975 | Evans et al. | 188/24.21 |
| 4,051,924 | 10/1977 | Yoshigai | 188/24.12 |
| 4,415,592 | 4/1984 | Everett | 188/24.12 |
| 4,972,927 | 11/1990 | Stephens et al. | 188/24.12 |
| 5,058,450 | 10/1991 | Yoshigai | 188/24.12 |
| 5,082,092 | 1/1992 | Yoshigai | 188/24.21 |
| 5,103,938 | 4/1992 | Yoshigai | 188/24.21 |
| 5,117,948 | 6/1992 | Yoshigai | 188/24.21 |
| 5,293,964 | 3/1994 | Li | 188/24.21 |

*Primary Examiner*—Douglas C. Butler

[57] ABSTRACT

A brake mechanism includes a pair of brake arms pivotally coupled to the bicycle. The brake arms each includes an oblong hole formed in the middle for engaging with a pair of bolts which may be adjusted along the oblong holes. The brake shoes are secured to the bolts which are directly secured to the brake arms such that no vibrations will be generated while braking. A pair of nuts each has a curved surface for engaging with a curved depression of a pair of gaskets so as to allow the nut to rotate relative to the second gasket.

1 Claim, 3 Drawing Sheets

5,547,046

BRAKE MECHANISM FOR BICYCLE

BACKGROUND OF THE INVENTION

1. Field of the Invention

The present invention relates to a brake mechanism, and more particularly to a brake mechanism for a bicycle.

2. Description of the Prior Art

A typical brake mechanism for a bicycle is shown in FIGS. 5 and 6 and comprises a pair of brake arms 90 having the lower ends pivotally coupled to the fork member 91 of the bicycle and having the upper ends coupled to a cable 95 which may actuate the brake mechanism. A pair of rods 93 are secured to the side portions of the brake arms 90 by bolts 92 and include the brake shoes 94 secured thereto for braking the wheels of the bicycles. However, the rods 93 and the brake shoes 94 are secured to the side portion of the brake arms 90, best shown in FIG. 6, such that the brake shoes 94 may rotate relative to the brake arms 90 when the brake shoes 94 are forced toward the wheel for braking the wheels of the bicycles and such the brake shoes 94 may not effectively brake the bicycles. In addition, a great vibration will be generated by the brake shoes.

The present invention has arisen to mitigate and/or obviate the afore-described disadvantages of the conventional brake mechanisms for bicycles.

SUMMARY OF THE INVENTION

The primary objective of the present invention is to provide a brake mechanism which may effectively brake the bicycles.

In accordance with one aspect of the invention, there is provided a brake mechanism for a bicycle comprising a pair of brake arms including a lower portion for pivotally coupling to the bicycle and including an upper portion for engaging with a cable, the brake arms each including a middle portion having an oblong hole formed therein, a pair of bolts engaged in the oblong holes of the brake arms respectively and adjustable along the oblong holes respectively, the bolts each including a first end having a brake shoe secured thereto and each including a second end having an outer screw formed therein, and a pair of nuts engaged with the outer threads of the bolts so as to secure the bolts to the middle portion of the brake arms. The brake shoes and the bolts are directly secured to the middle portions of the brake arms so as to reduce vibrations while conducting braking operations.

The nuts each includes a first end having a curved surface formed therein. The brake mechanism further comprises a pair of washers each including a curved recess corresponding to the brake arms for engaging with the brake arms, a first gasket engaged on the bolt and engaged between a first of the washers and the brake shoe, a second gasket engaged on the bolt and engaged between a second of the washers and the nut, and a spring means engaged between the second gasket and the second washer. The second gasket includes a curved depression formed therein for engaging with the curved surface of the nut so as to allow the nut to rotate relative to the second gasket within a limited angle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
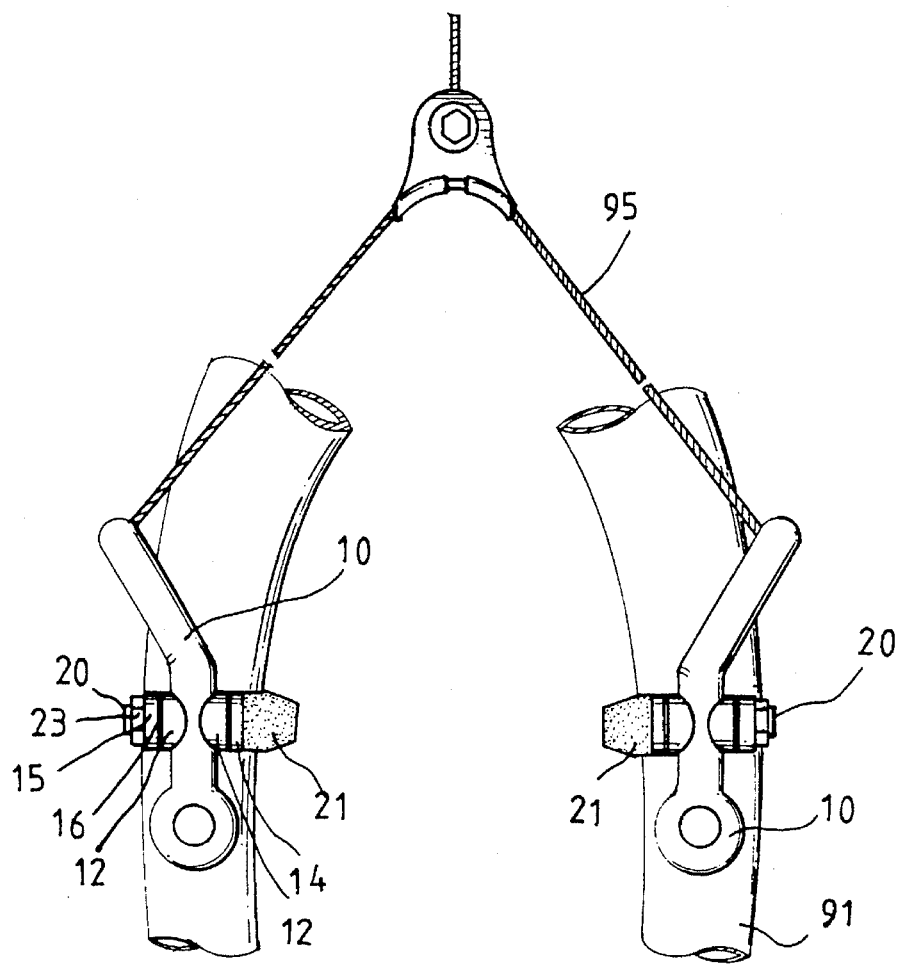
FIG. 1 is a plane view of a brake mechanism for a bicycle in accordance with the present invention.
Figure 2:
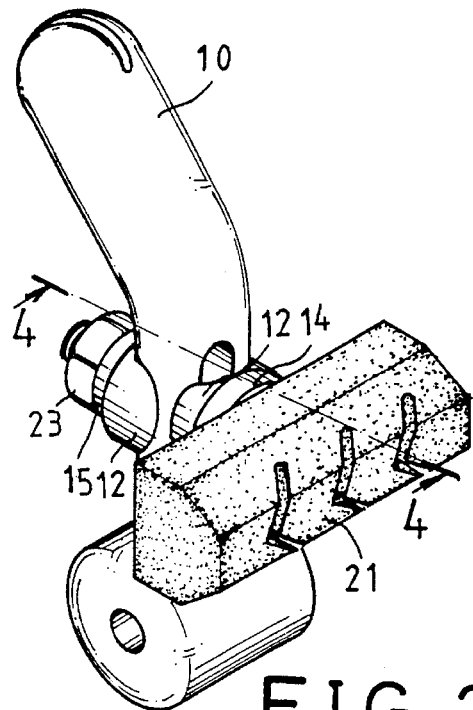
FIG. 2 is a perspective view of the brake mechanism.
Figure 3:
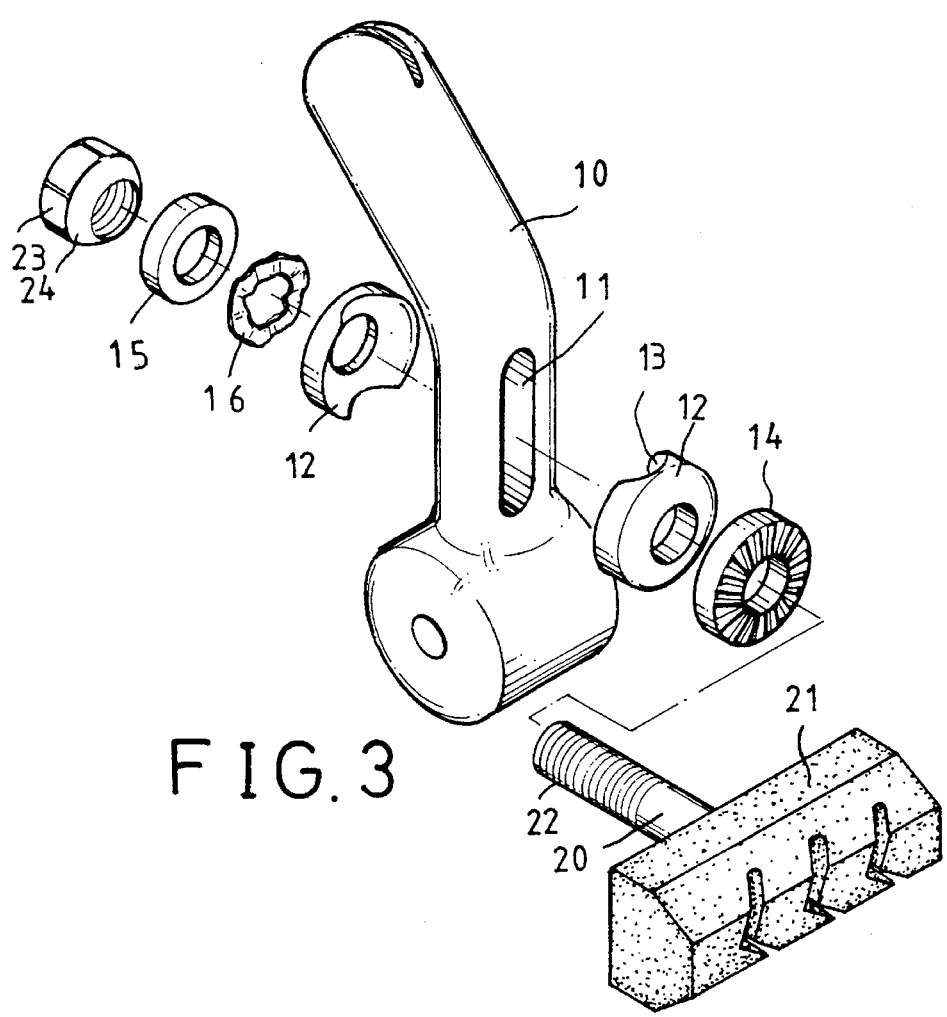
FIG. 3 is an exploded view of the brake mechanism.
Figure 5:
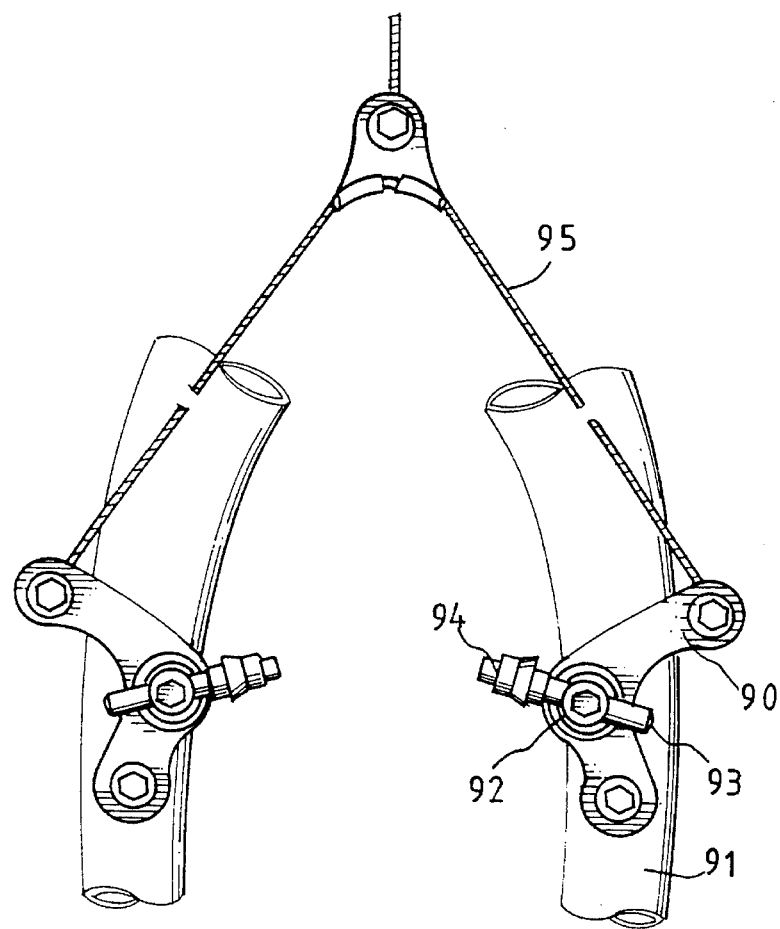
FIG. 5 is a plane view illustrating the typical brake mechanism for the bicycle.
Figure 6:
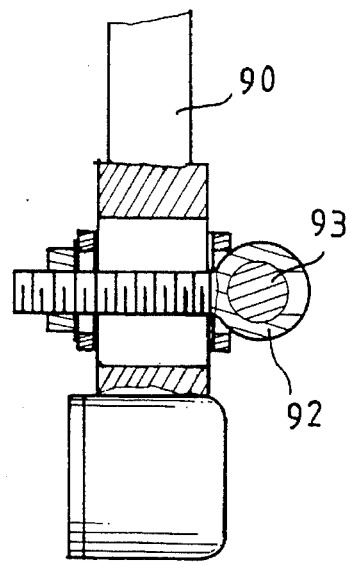
FIG. 6 is a partial cross sectional view of the typical brake mechanism, illustrating the skew engagement of the brake shoe securing rod to the brake arms.

Referring to the drawings, and initially to FIGS. 1 to 3, a brake mechanism in accordance with the present invention comprises a pair of brake arms 10 having the lower ends pivotally coupled to the fork member 91 of the bicycle and having the upper ends coupled to a cable 95 which is provided for actuating the brake mechanism. The brake arms 10 each includes an oblong hole 11 formed in the middle portion thereof for engaging with a bolt 20. The bolts 20 each includes a brake shoe 21 secured to one end thereof and each includes an outer thread 22 formed on the other end for engaging with a nut 23 which includes a curved surface 24 formed in one end thereof.

The bolts 20 each includes a pair of washers 12 engaged thereon and engaged with the side portions of the brake arms 10 respectively. The washers 12 each includes a curved recess 13 formed therein and having a shape corresponding to that of the side portions of the brake arms 10 so as to engage with the side portions of the brake arms 10. A gasket 14 is engaged between the brake shoe 21 and the washer 12 and another gasket 15 is engaged between the nut 23 and the washer 12. A ring 16 is engaged between the washer 12 and the gasket 15 and includes a wave shape formed therein so as to form a spring means.

Figure 4:
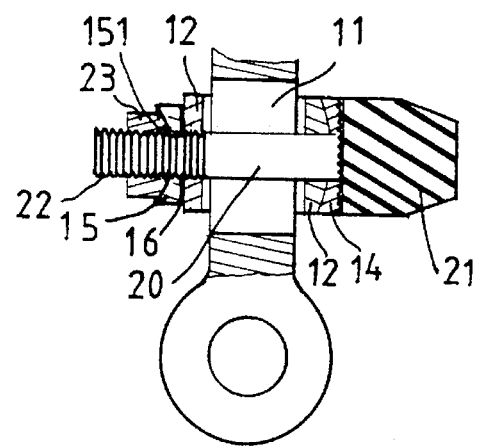
FIG. 4 is a cross sectional view taken along lines 4—4 of FIG. 2.

Referring next to FIG. 4, the gasket 15 includes a curved depression 151 formed therein for engaging with the curved surface 24 of the nut 23 such that the nut 23 may be rotated relative to the gasket 15 within a limited angle. The bolts 20 may be adjusted along the oblong holes 11 to suitable positions for suitably engaging the brake shoes 21 with the wheels.

In operation, as shown in FIGS. 1 and 2, the brake shoes 21 and the bolts 20 are directly secured to the brake arms 10 such that the bolts 20 and the brake arms 10 are located in an identical plane and such that the bolts 20 will not rotate relative to the brake arms 10 when the brake shoes 21 are engaging with the bicycle wheels for conducting braking operations, and such that no vibrations will be generated by the brake shoes.

Accordingly, the brake mechanism in accordance with the present invention includes a pair of brake shoes secured to the bolts which are directly secured to the brake arms 10 such that no vibrations will be generated while conducting braking operations.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake mechanism for a bicycle comprising:

a pair of brake arms including a lower portion for pivotally coupling to the bicycle and including an upper portion for engaging with a cable, said brake arms each including a middle portion having an oblong hole formed therein, a pair of bolts engaged in said oblong holes of said brake arms respectively and adjustable along said oblong holes respectively, said bolts each including a first end having a brake shoe secured thereto and each including a second end having an outer screw formed therein, a pair of nuts engaged with said outer threads of said bolts so as to secure said bolts to said middle portion of said brake arms, said nuts each including a first end having a curved surface formed therein, a pair of washers each including a curved recess corresponding to said brake arms for engaging with said brake arms, a first gasket engaged on said bolt and engaged between a first of said washers and said brake shoe, a second gasket engaged on said bolt and engaged between a second of said washers and said nut, said second gasket including a curved depression formed therein for engaging with said curved surface of said nut so as to allow said nut to rotate relative to said second gasket, and a spring means engaged between said second gasket and said second washer, said brake shoes and said bolts being directly secured to said middle portions of said brake arms so as to reduce vibrations while conducting braking operations.

* * * * *